United States Patent [19]

Nagorcka et al.

[11] Patent Number: 5,622,234
[45] Date of Patent: Apr. 22, 1997

[54] TRACK SUSPENSION SYSTEM AND TRACK GAUGE ADJUSTMENT ASSEMBLY

[75] Inventors: James A. Nagorcka, Tarrington, Australia; Mervin P. Kizlyk, Cedar Falls, Iowa

[73] Assignee: Deere & Company, Moline, Ill.

[21] Appl. No.: 172,693

[22] Filed: Dec. 22, 1993

[51] Int. Cl.⁶ .................................................. B62D 55/04
[52] U.S. Cl. ........................ 180/9.5; 180/9.54; 305/128; 305/129
[58] Field of Search ...................... 180/9.5, 9.52, 180/9.54, 9.56, 9.58, 9.1; 305/125, 127, 128, 129, 134

[56] References Cited

U.S. PATENT DOCUMENTS

| | | | |
|---|---|---|---|
| 1,980,276 | 11/1934 | Kegresse | 180/9.58 |
| 2,277,322 | 3/1942 | Heaslet | 180/9.54 |
| 3,664,449 | 5/1972 | Vardell . | |
| 3,700,115 | 10/1972 | Johnson et al. . | |
| 3,712,398 | 1/1973 | Althaus . | |
| 3,826,325 | 7/1974 | Purcell et al. | 180/9.54 |
| 3,899,038 | 8/1975 | Griffith et al. . | |
| 4,339,156 | 7/1982 | Livesay . | |
| 4,519,654 | 5/1985 | Satzler et al. . | |
| 4,744,431 | 5/1988 | Stollinger . | |
| 5,072,800 | 12/1991 | Price . | |
| 5,273,126 | 12/1993 | Reed et al. | 180/9.54 |

FOREIGN PATENT DOCUMENTS

WO91/07306  5/1991  WIPO .

*Primary Examiner*—Anne Marie Boehler

[57] ABSTRACT

A suspension system for a tracked vehicle comprising a first axial member pivotally coupled to the main drive wheel axle housing and extending forward towards the idler wheel, and a second axial portion pivotally coupled to the first axial member and to which the idler wheel is rotatively mounted. The second axial member is provided with a track roller extension on which is mounted a track roller frame having three pairs of track rollers. The first axial member is coupled to the tractor frame by a pendulum assembly. The pendulum assembly comprises first and second parallel tubes having cylindrical apertures. The tubes are parallel to and offset from one another so that an outwardly projecting transverse stub shaft from the tractor frame is received in one aperture and an inwardly projecting transverse stub shaft from the suspension system is received in the other aperture.

8 Claims, 4 Drawing Sheets

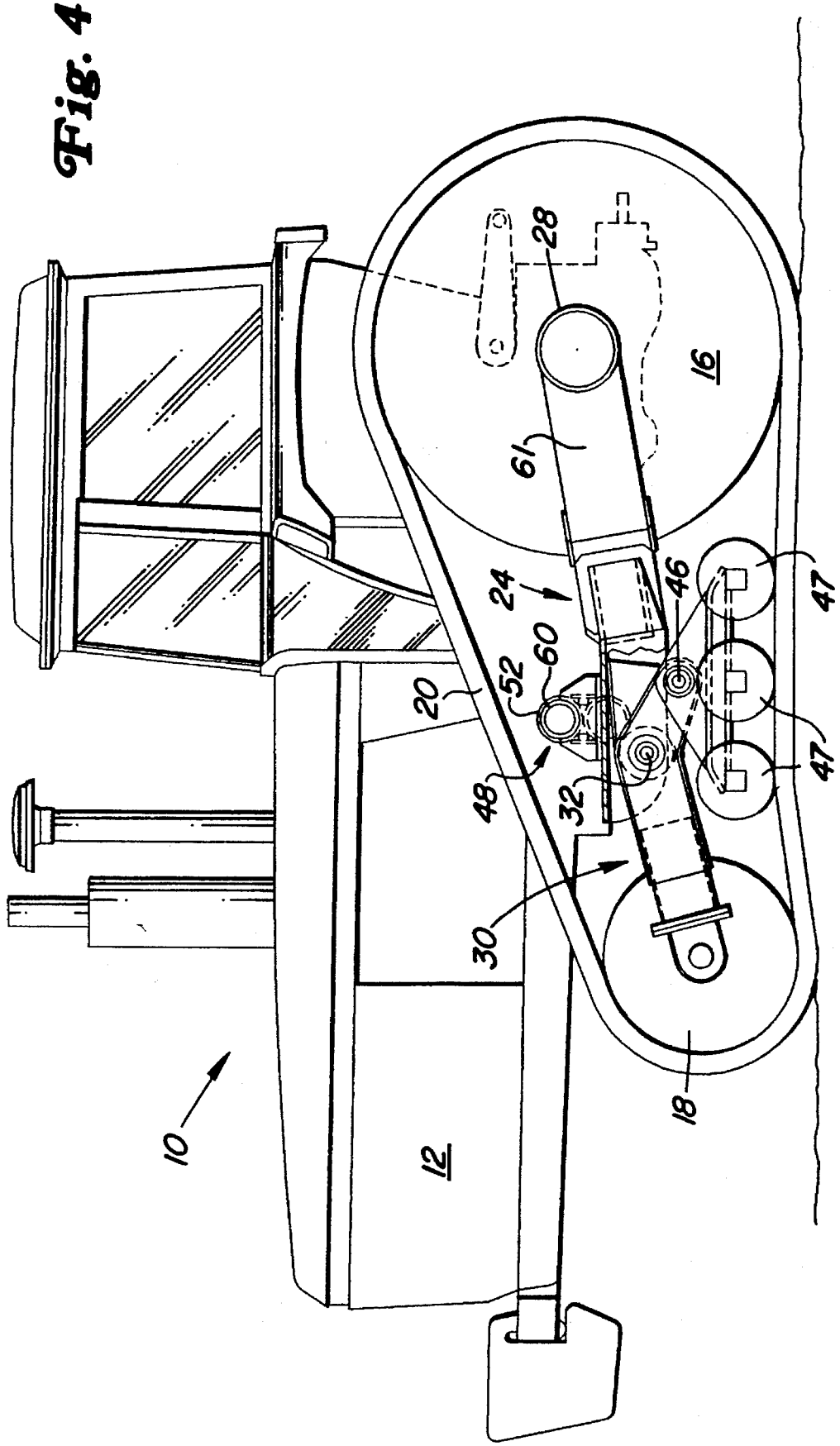

TRACK SUSPENSION SYSTEM AND TRACK GAUGE ADJUSTMENT ASSEMBLY

BACKGROUND OF THE INVENTION

1. Field of the Invention

The invention is directed to a track suspension system and track gauge adjustment assembly.

2. Description of the Prior Art

Tracked vehicles are typically provided with a main drive wheel and an idler around which a track is mounted. The track maybe a segmented steel track or a belted track. Between the idler and the main drive wheel are track rollers which distribute the vehicle's weight along the track. The track rollers are mounted to the track frame in either a rigid or active configuration. U.S. Pat. Nos. 4,339,156, 4,519,654 and 4,744,431 disclose various track roller configurations. Of particular interest is U.S. Pat. No. 4,339,156 in which the track roller is mounted to the idler.

In adapting tracked vehicles to agricultural use it is sometimes necessary to change the gauge of the track by sliding it closer to or away from the main tractor frame. Examples of track gauge adjustment systems are disclosed in U.S. Pat. Nos. 3,664,449, 3,700,115, 3,712,398, 3,899,038 and 5,072,800.

SUMMARY

It is an object of the present invention to provide a simplified track suspension system.

It is another object of the present invention to provide a compact and simplified assembly for adjusting the track gauge on a crawler.

The present tracked vehicle suspension system comprises a first axial member pivotally mounted to the main drive wheel axle housing extending towards the idler, and a second axial member pivotally coupled to the first axial member on which the idler wheel is rotatively mounted. The first and second axial members are pivotally coupled to one another at an axial member pivot.

The first axial member is coupled to the tractor frame by a pendulum assembly having vertical and horizontal centerlines. The pendulum assembly is pivotally coupled to the tractor frame and the first axial member. The pendulum assembly is provided with a transverse tractor frame cylindrical aperture and a transverse suspension system cylindrical aperture. Each cylindrical aperture defines an axis. The axes are parallel to one another. The first axial member is provided with a stub shaft that is received in the suspension system aperture. The tractor frame is also provided with a stub shaft that is received in the tractor frame cylindrical aperture. The cylindrical tubes are parallel and offset from one another, so that the stub shafts are allowed to overlap one another.

The second axial member is a telescoping member that is used for tensioning the track entrained around the drive wheel and the idler. The second axial member is also provided with a track roller extension that extends downwardly and rearwardly from the axial member pivot. A track roller frame is pivotally mounted to the track roller extension at a track roller frame pivot. Three pairs of track rollers are rotatively mounted to the track roller frame.

The vertical pendulum centerline is located between the vertical planes defined by the axial member pivot and the track roller frame pivot. The horizontal plane defined by the axial member pivot is located between the horizontal plane defined by the track roller frame pivot and the horizontal centerline of the pendulum assembly.

BRIEF DESCRIPTION OF THE DRAWINGS

FIG. 4 is a side view of the present invention encountering a depression.

DETAILED DESCRIPTION

Figure 1:
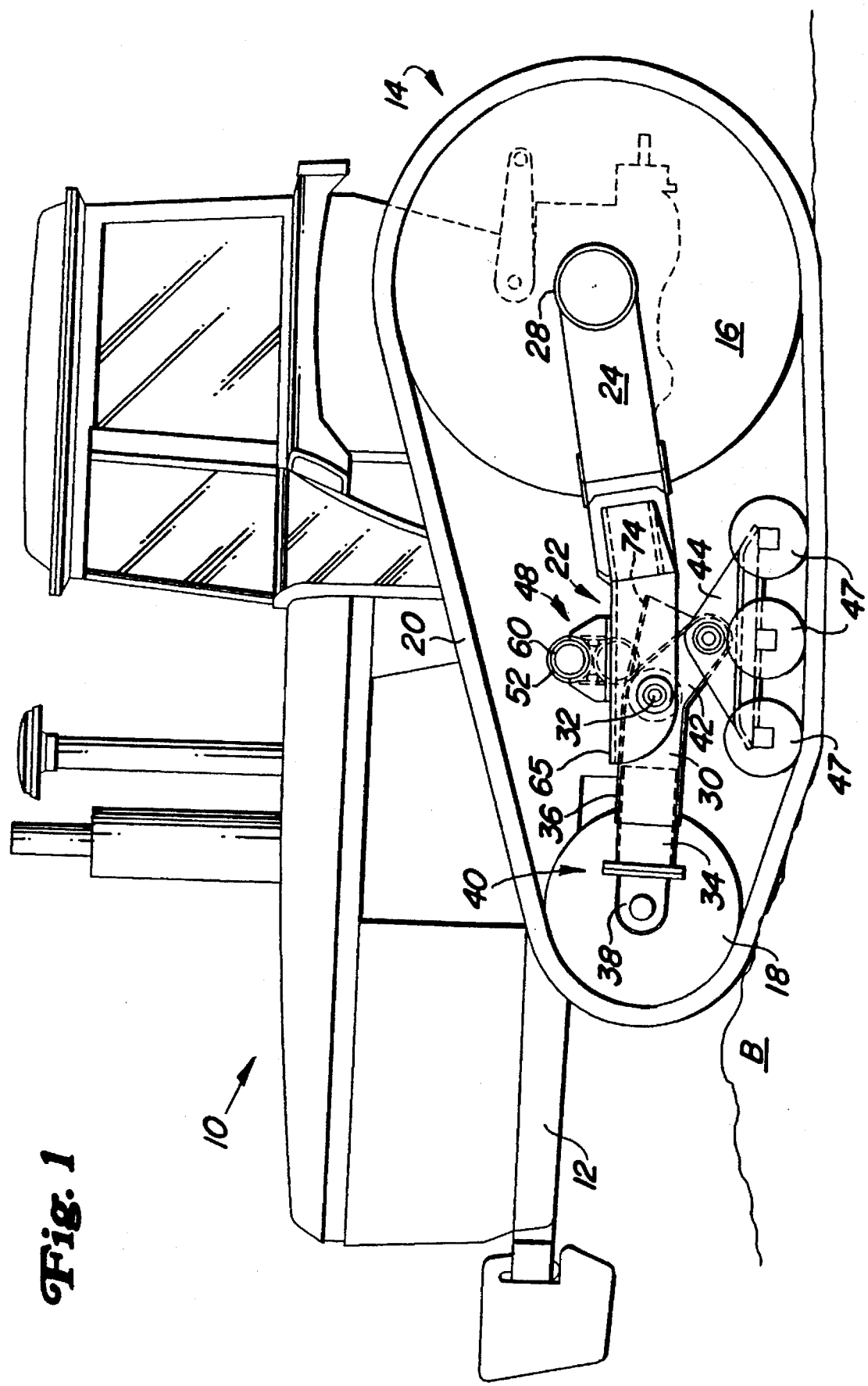
FIG. 1 is a side view of the present invention mounted to a tractor encountering a bump.
Figure 2:
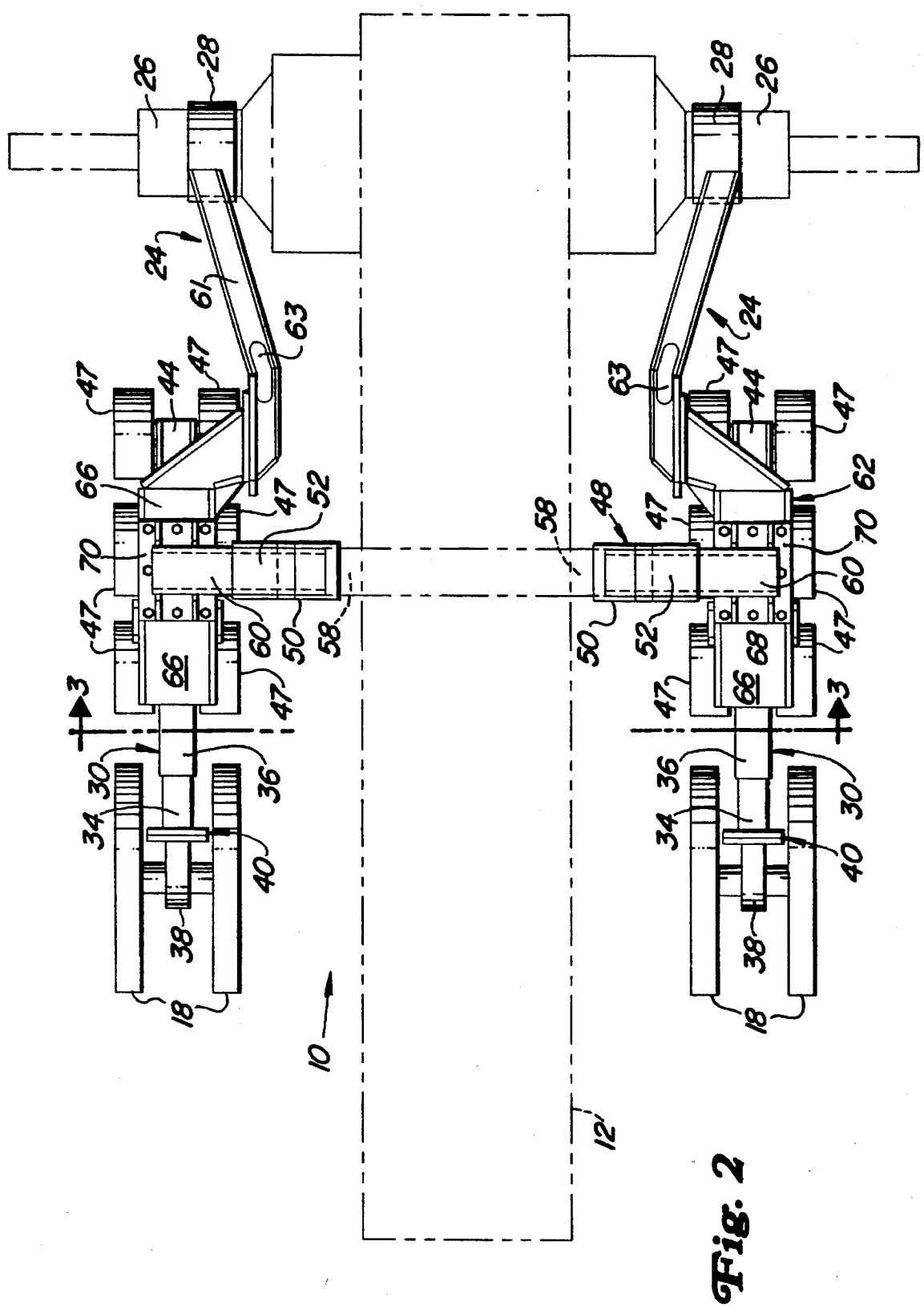
FIG. 2 is a top view of the present invention.
Figure 3:
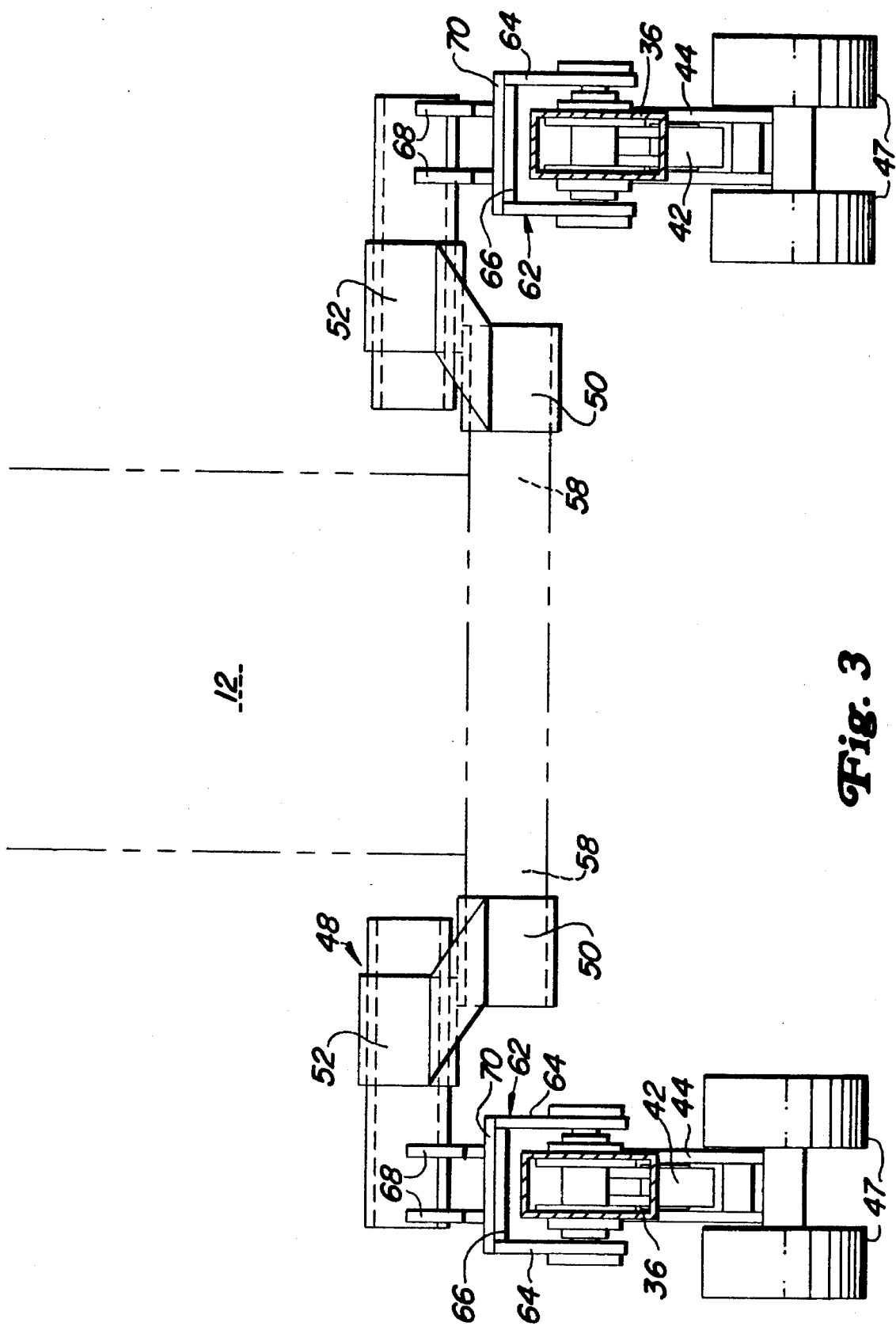
FIG. 3 is a frontal cross sectional view taken along line 3—3 in FIG. 2.

Tracked vehicle 10 is a full tracked agricultural tractor having a tractor frame 12 holding an internal combustion engine and transmission for driving track undercarriage 14. The undercarriage comprises a main drive wheel 16 driven by the transmission and an idler wheel 18. A positively driven belted track 20 surrounds the main drive wheel 16 and idler wheel 18.

The undercarriage is also provided with a suspension system 22. The suspension system comprises a first axial member 24 that is pivotally coupled to the main drive wheel axle housing 26 by cylindrical tube 28, and a second axial member 30 that is pivotally coupled to the first axial member 24 at axial member pivot 32. The idler wheel 18 is rotatively mounted to the second axial member. The first axial member 24 extends from the main drive wheel 16 towards the idler wheel 18, and the second axial member 30 extends from the idler wheel 18 towards the main drive wheel 16.

The second axial member 30 is a telescoping member having a forward rectangular tube 34 that nests inside receiving rectangular tube 36. The bearing member 38 for the idler wheel is bolted to the forward rectangular tube at flange assemblies 40. A tensioning hydraulic cylinder and recoil spring, not shown, are housed in the telescoping members for tensioning the track.

The second axial member 30 is also provided with a track roller extension 42 that extends rearwardly and downwardly from the axial member pivot 32. A triangular track roller frame 44 is pivotally coupled to the track roller extension at the track roller frame pivot 46. Three pairs of track rollers 47 are rotatively mounted to the track roller frame 44.

The first axial member 24 is also coupled to the tractor frame by pendulum assembly 48. The pendulum assembly 48 comprises two hollow cylindrical tubes 50 and 52 that are welded to one another and joined together by reinforcing member 54. The first cylindrical tube 50 is provided with a frame cylindrical aperture for receiving a cylindrical stub shaft 58 projecting from the tractor frame 12. The second cylindrical tube 52 is provided with a suspension system cylindrical aperture for receiving cylindrical stub shaft 60 from the first axial member 24 of the suspension system 22.

The two hollow cylindrical tubes 50 and 52 may each comprise split sleeves having outwardly projecting flanges. The flanges are connected by bolts which when tightened, tighten the cylindrical tubes about the stub shaft locking them in place.

The central transverse axes of the two tubes 50 and 52 form a vertical centerline. A horizontal centerline is perpendicular to the vertical centerline and passes through the vertical centerline at a point located midway between the transverse axes.

The tubes 50 and 52 are parallel to and offset from one another. They are offset so that the two stub shafts 58 and 60 do not interfere with each other as they are inserted into the pendulum assembly 48. In this way a single long shaft is not required to provide a range of gauge positions as the stub shafts can be inserted into the pendulum assembly to varying degrees as they are not coaxial to one another.

To aid in adjusting the gauge of the track undercarriage, two screwjacks are located between the first axial members 24 and the tractor frame 12. In addition, a guide pin could be mounted to the first axial member 24 adjacent to axle housing 26. The guide pin would ride in a slot formed in a member projecting outward from the tractor frame 12. When the gauge needs to be adjusted the tractor frame would be lifted upwardly so that the tracts are no longer in contact with the ground. The flanges of the pendulum assembly 48 would then be loosened, and the screwjack turned, thereby driving the track frame towards or away from the tractor frame. The guide pins on the first axial member together with the stub shafts and the pendulum assembly would ensure that the track frame is parallel to the tractor frame.

The rear portion 61 of the first axial member 24 bends inwardly towards the tractor frame to accommodate main drive wheel 16. After clearing the main drive wheel 16, the first axial member 24 curves outwardly to the axial centerline of the track. Plate 63 is a reinforcing plate for portion 61 of the first axial member 24.

The forward portion 62 of the first axial member is arranged along the axial centerline of the track. It comprises an inverted U-shaped member having downwardly projecting legs 64 and a horizontal flange 66. The suspension system stub shaft 60 is welded to tangs 68 that project upwardly from horizontal plate 70. Horizontal plate 70 is bolted to horizontal flange 66.

The forward portion 62 of the first axial member 24 encloses the bent portion of the second axial member 30. The forward portion 62 also provided an up stop extension 65. The underside of the horizontal plate 70 forms upward and downward stops for the pivoting movement of the second axial member 30. As illustrated in FIG. 1, when the idler wheel 18 encounters a bump B the idler wheel is forced upwardly and the track roller extension 42 of the second axial portion 30 is forced downwardly increasing the load being applied to the track rollers 47. Further upward movement of the idler is prevented by the top surface of rectangular tube 36 contacting the underside of the up stop extension 65. The top surface of rectangular tube 36 may be provided with a rubber bumper for contacting the up stop extension 65 of the first axial member 24.

The second axial member 30 is provided with a down stop extension 74 which prevents excessive downward movement by the idler wheel as the idler wheel 18 wheel encounters a depression or hole. As shown in FIG. 4, as the idler wheel 18 encounters a depression, the track roller extension 42 of the second axial member 30 is pivoted upwardly until the top surface of the down stop extension 74 contacts the underside of horizontal flange 70. The down stop extension 74 may be provided with a rubber bumper for cushioning its contact with the underside of horizontal flange 70.

The arrangement of pivots is an important factor in the proper operation of the suspension system. More specifically, the vertical centerline of the pendulum assembly 48 is located between the vertical planes formed by the track roller pivot 46 and the axial member pivot 32. In addition, the horizontal plane defined by the axial member pivot 32 is located between the horizontal centerline of the pendulum assembly 48 and the horizontal plane defined by the track roller pivot 46.

The present invention should not be limited by the above described embodiments, but should be limited solely by the claims that follow.

We claim:

1. A suspension system for a tracked vehicle, the tracked vehicle having a frame, with a main drive wheel axle housing, a main drive wheel and a idler wheel, a track extends around the main drive wheel and the idler, the suspension system comprising:

a first axial member being pivotally coupled to the main drive wheel axle housing, the first axial member extending from the main drive wheel towards the idler wheel, the first axial member being coupled to the frame of the vehicle by a pendulum assembly, the pendulum assembly is pivotally coupled to the frame and the first axial member, the pendulum assembly defining a vertical centerline;

a second axial member being pivotally coupled to the first axial member at an axial member pivot, the idler wheel is rotatively mounted to the second axial member, the second axial member extending from the idler wheel towards the main drive wheel, the second axial member being provided with a track roller extension;

a track roller frame pivotally mounted to the track roller extension of the second axial member at the track roller frame pivot, the track roller frame is provided with a plurality of track rollers which engage the track.

2. A suspension system as defined by claim 1 wherein the second axial member is a telescoping member for tensioning the track.

3. A suspension system as defined by claim 2 wherein the track roller extension extends downwardly and rearwardly from the axial member pivot.

4. A suspension system as defined by claim 3 wherein the axial member pivot defines an axial member pivot vertical plane and the track roller frame pivot defines a track roller pivot vertical plane, the vertical centerline of the pendulum assembly being located between the axial member pivot vertical plane and the track roller frame pivot vertical plane.

5. A suspension system as defined by claim 4 wherein the second axial member is provided with a down stop extension for preventing further pivoting movement of the second axial member downwardly relative to the first axial member when the idler wheel moves downwardly.

6. A suspension system as defined by claim 5 wherein the first axial member is provided with a horizontal flange on which the down stop extension bears to prevent further downward movement by the idler wheel.

7. A suspension system as defined by claim 6 wherein the horizontal flange of the first axial member is provided with an up stop extension for preventing further pivoting movement of the second axial member upwardly relative to the first axial member when the idler wheel moves upwardly.

8. A suspension system as defined by claim 7 wherein the second axial member bears against the horizontal flange to prevent further upward movement by the idler wheel.

* * * * *